INVENTOR.
CHARLES A. MORCHAND

United States Patent Office 3,008,000
Patented Nov. 7, 1961

3,008,000
ACTION-REACTION TELEVISION SYSTEM
Charles A. Morchand, 288 Lexington Ave.,
New York 16, N.Y.
Filed Sept. 11, 1958, Ser. No. 760,446
17 Claims. (Cl. 178—5.6)

This invention relates to educational and amusement devices and more particularly to visual information transfer systems which provide for viewer participation.

In recent years, the field of education has seen the introduction of courses presented by absentee teachers. These courses are usually lectures recorded on motion picture film for presentation at a later time to a group of students. Usually, the motion picture operator is purely a technician who cannot answer any of the questions that the students may ask during the course of the lecture.

Other courses are presented on what is now known as educational television. The lecturer or teacher remains in a television studio and the discourse is transmitted to students at remotely located television receivers. The students grouped around these receivers can only partially participate in the course. Generally, they have no access to the lecturer or instructor for the immediate answering of questions.

In either of these modes of presentation, there is only a unidirectional flow of information. Information only flows from the instructor to the student and never in the reverse direction. Thus, if a student does not understand a portion of the lecture, he is unable to request a repeating or clarification of the misunderstood point. Often, from this point on, the student becomes confused and frustrated so that the value of the course is greatly diminished.

Similarly, over present-day television, there are do-it-yourself courses, such as cooking, which lead a viewer step by step through the preparation of a recipe. It often happens that the viewer misses or does not quite understand the performance of one of these steps. At present, he has no way of causing the missed step to be repeated. Therefore, from this step onward the directions are almost worthless.

Furthermore, with the increased use of the technique of training by simulation, it has been found that the more realistic the simulation, the more rapid the rate of trainee learning. Most present-day training simulators which teach the operation of controls, generally are restricted in their degree of realism. Although there are simulators which create visual stimuli to cause the trainee to operate controls, these visual stimuli do not truly follow through after the operation of the control. Whereas in reality the operation or non-operation of a control in response to stimuli creates two different situations, the visual stimuli in the simulator cannot switch from one situation to the other and the trainee cannot fully appreciate the consequences of incorrectly operating the controls.

It is accordingly an object of the invention to provide a visual information transfer system which permits greater viewer participation.

It is another object of the invention to provide an educational television system which permits a viewer to control the remotely located instructors' presentation of information.

It is an object of another aspect of the invention to provide a training device, such as a simulator, which enhances the realism associated with the simulation.

Briefly, the invention contemplates providing an information transfer system which comprises a plurality of sources of information. Means are associated with each of said sources for transmitting control functions related to the sources. A receiving means is provided for presenting the information to a subject. Selection means associated with the receiving means are operable by the subject in response to the presented information so that the subject may select one of the sources. Control means responsive to the control functions, control the selection means to permit the operation of the selection means only when the received control function is related to the source selected by the subject.

It should be noted that the sources of information will in general transmit related types of information so that the subject, at predetermined times during the presentation, is given the option to switch to another source of information where he may either be again presented with the same information or presented with amplifying information. In this way, the subject is given the option at a branch point to select the type of information he wishes.

Other objects, features and advantages of the invention will be evident from the following detailed description when read in connection with the accompanying drawings wherein.

Figure 1:
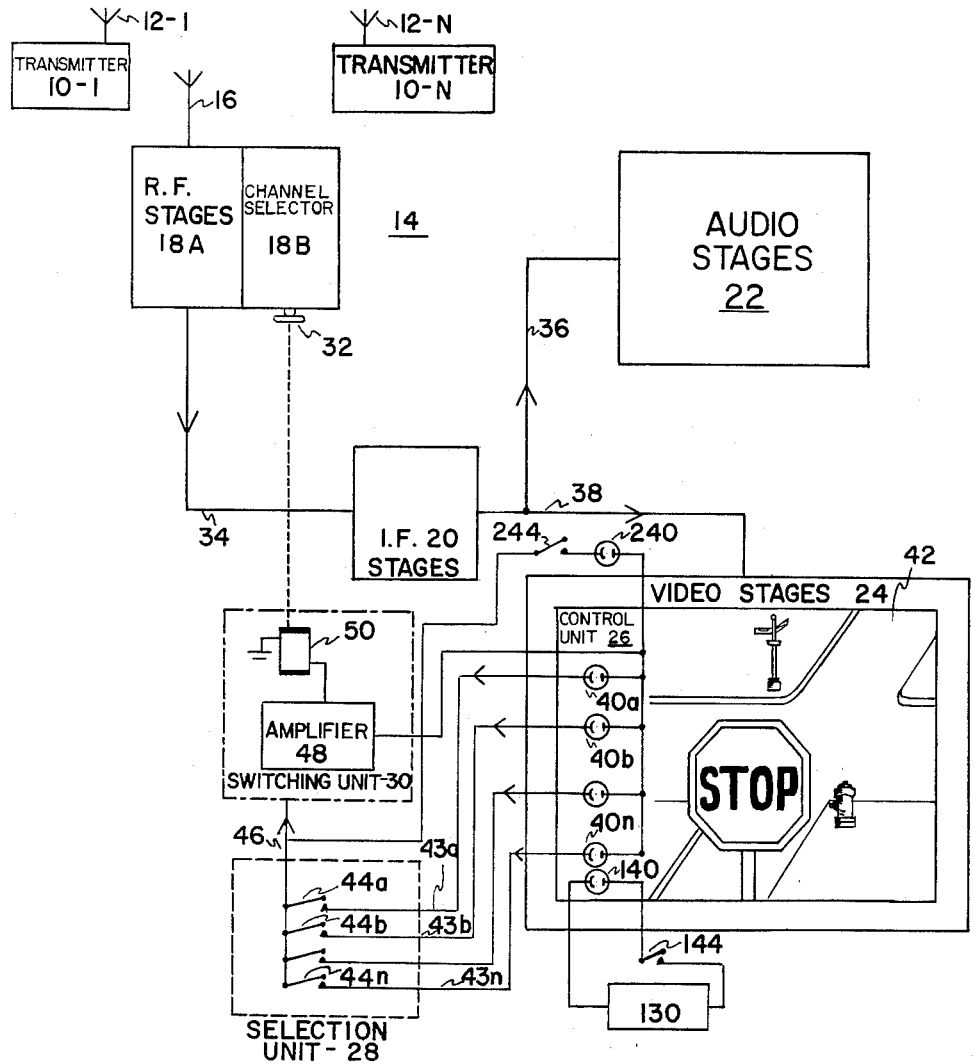
FIG. 1 is an educational and amusement television system in accordance with one embodiment of the invention.

Referring to FIG. 1, an information transfer system is shown comprising a plurality of television transmitters 10–1 to 10–N simultaneously transmitting signals via associated antennas 12–1 to 12–N to a television receiver 14. The television receiver 14 comprises conventional RF stages and channel selector 18, conventional IF stages 20, conventional audio stages 22, and conventional video stages 24. Included in television receiver 14 are a control unit 26, a selection unit 28, and a switching unit 30. Under normal operating conditions, a viewer positions the switch 32 in channel selector 18B to the channel selected for viewing. The signals pass from the RF stages 18a via the line 34, to the IF stages 20. The audio and video signals are separated in the IF stages 20 with the audio signals passing via the line 36 to the audio stages 22 and the video signals enter the video stages 24 via the line 38. The viewer receives the program being transmitted on the selected channel in a conventional manner.

However, during the transmission of an audience participation program such as an educational television program, the video signals are slightly modified. In particular, at times selected by the lecturer, a plurality of spots of light are introduced along one edge of the picture presented by the video stages 24 of the television receiver 14. These spots of light appear at predetermined areas of the display tube 42. A plurality of photocells 40 in the control unit 26 are disposed respectively above each one of these areas. Each of the photocells 40 is shaded so that it can only receive light from the area of the display tube 42 which is in its immediate vicinity. If one of the photocells 40 detects a spot of light on the display tube 42, it transmits a signal via an associated line 43 to an associated switch 44 in the selection unit 28. Switches 44, which are spring biased to their open position, are operated by the viewer. Signals passed by the switches 44 are transmitted via a line 46 to an amplifier 48 in switching unit 30. Each time amplifier 48 receives a signal, solenoid 50 is energized to move switch 32 in channel selector 18B one position. Thus, whenever a spot of light is sensed by one of the photocells 40 and its associated switch 44 is closed, channel selector 18B will shift to the next channel. Further, if instead of detecting a continuous spot of light there are a sequence of spots in the same position, a plurality of impulses will be fed to switching unit 30 and after a time delay during which they are accumulated will cause solenoid 50 to move channel selector 18B one channel for each impulse.

In summary, if during the transmission of an educational program, for example, spots of light momentarily appear at predetermined areas of display tube 42, and the viewer has been alerted to operate particular ones of the switches 44 in the selection unit 28, it is possible to cause the television receiver 14 to switch to the reception of signals from another of the transmitters 10. Such a system can be used in many ways.

For example, consider the type of program wherein a lecturer is giving a course in one of the social sciences. In such a case, the selection unit 28 would be basically a control box with a plurality of hand operated switches in easy access to the viewer and the plurality of transmitters 10 would be under the control of an operator. At the start of the program the viewer would operate switch 32 in channel selector 18B to receive the signals from, i.e., transmitter 10–1. Sometime during the course of the lecture, a critical point is arrived at, and the lecturer would instruct his audience to depress, for example, in selection unit 28 switch 44a if they wish to have the point repeated, or to depress switch 44b if they want the point to be further expanded. Then the operator is cued to incorporate spots of light on the image being transmitted. The operator then flashes one spot of light in the region under photocell 40a and two sequential spots of light under the region of photocell 40b. If switch 44a is depressed, a single impulse is fed to amplifier 48 and solenoid 50 moves switch 32 to the next channel. If, however, switch 44b is depressed, the two impulses generated by photocell 40b are fed to amplifier 48 and solenoid 50 causes channel selector 18B to move to the second succeeding channel. During this time the transmitters 10–2 and 10–3 transmit the desired information. At the end of the explanations given on these channels, the viewer is then instructed to close one of the appropriate switches 44 and a sufficient number of flashes of light are generated at the appropriate transmitter to cause the channel selector 18B to return to the home transmitter 10–1 where the main portion of the lecture is again picked up.

In addition to the photocells 40a–n, a photocell 140 is connected in series with a switch 144 to a unit 130. Unit 130 may be, for example, means for controlling the lights in the room. Thus, for example, a lamp may be switched on or off through the actuation of unit 130 provided switch 144 is closed when photocell 140 detects a spot of light.

Further, a photocell 240 is connected via a switch 244 to switching unit 30 to permit the viewer under certain conditions to cause a switching of the program merely by flashing a searchlight on the photocell 240 provided the switch 244 is closed.

A further important feature of the system is the introduction of the posibility for a delayed reaction. For example, if the viewer has closed both switches 44a and 44b and signals are being received from transmitter 10–1 a point of light may be generated under photocell 40b causing channel selector 18B to switch to transmitter 10–2. However, the effect of having closed switch 44a will not occur until later when a spot of light is generated which is detected by photocell 40a causing channel selector 18B to return to transmitter 10–1. In this way, the studio has a degree of control over the presentation of information to the viewer.

Figure 2:
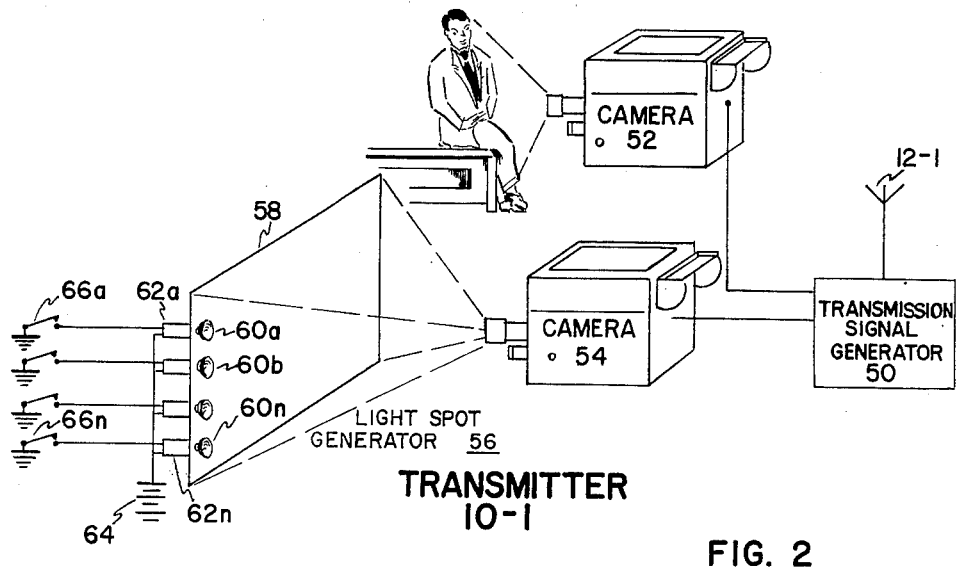
FIG. 2 is a schematic representation of one of the plurality of television transmitters associated with the system of FIG. 1.

FIG. 2 shows a representative transmitter 10–1 which comprises a transmission signal generator 50, a camera 52 for monitoring the lecturer, and a camera 54 for monitoring the light spot generator 56. The scenes viewed by camera 52 and camera 54 are superimposed in transmission signal generator 50 by conventional techniques.

Light spot generator 56 comprises a darkened mask 58 with a plurality of apertures 60 behind which are light bulbs 62 which may be shaded. One terminal of each light bulb is connected to a source of voltage 64. The other terminal of each light bulb 60 is connected to a fixed contact of a switch 66. Thus, each time a switch 66 is closed, its associated light bulb 62 is lit. With none of the light bulbs 62 lit, camera 54 is viewing a dark image and adds nothing to the signal transmitted from transmission signal generator 50. However, when one of the light bulbs 62 is lit, signals representing the spot of light are effectively superimposed or introduced into the video signal transmitted in accordance with the image being viewed by camera 52.

Although the switches 66 are shown for manual operation, it should be noted that it is readily possible to mechanize the operation of the switches 66 by well-known switch control apparatus such as pre-punched paper tape devices. Conventional synchronizing techniques may be used to drive the pre-punched paper tape devices of all the transmitters 10.

It should be further noted that although transmitter 10–1 schematically represents the transmission of a live program, it can equally well transmit filmed programs. During the transmission of filmed programs, the light spot generator can be eliminated and the spots are printed on the film. Such a procedure minimizes the amount of apparatus required at the transmitter 10–1 and also readily lends itself to more sophisticated editing techniques.

Although the system has been explained with respect to a lecture being delivered during an educational television program, the system can readily be used for a training simulator. In this case, the switches 44 of selection unit 28 in FIG. 1, are operated by the controls of the simulator.

Figure 3:
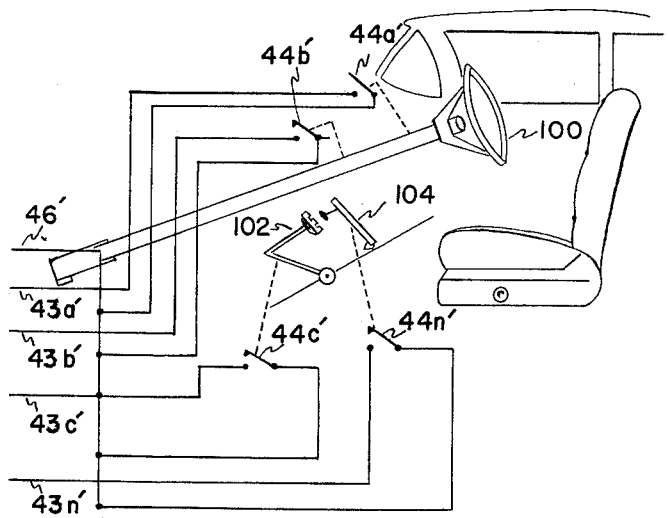
FIG. 3 is a schematic representation of a training simulator to be incorporated in the selection unit of FIG. 1 in accordance with another embodiment of the invention.

In particular, FIG. 3 shows a selection unit 28' incorporated in the schematic representation of a simulator for teaching the driving of an automobile to a trainee.

For example, the switch 44a' is closed whenever the steering wheel 100 is turned to the right and the switch 44b' is closed whenever the steering wheel 100 is turned to the left. Similarly, the switch 44c' is closed whenever the brake pedal 102 is depressed and the switch 44n' is closed whenever the accelerator pedal 104 is similarly depressed. During the operation of the system, in conjunction with a training simulator, the scene viewed or presented to the viewer may be the same as the scene viewed by the driver of an automobile.

For example, the viewer or trainee may be told that he is to make a right-hand turn at the next corner, and he will see the approach of the corner on the display tube. Just prior to the reaching of the corner, a spot of light will be superimposed on the display tube 42 for sensing by the photocell 40a. If the trainee then turns the steering wheel to the right, switch 44a' will be closed and an impulse will be sent along the line 46' to the switching unit 30 (FIG. 1), causing the channel selector 18B to move to the next channel, and the trainee will see the turn being made. However, if he does not turn the steering wheel 100 to the right, the television receiver 14 will continue to receive signals from the same channel and the trainee will see the car effectively move straight ahead. Thus the trainee is graphically presented with the results of his manipulation of the controls. Although the simulator is specifically related to an automobile, other devices such as aeroplanes, and machinery are equally applicable.

While the system has been further described with respect to a simulator, it should be noted that it can equally well be used with an actual piece of machinery wherein the conventional operator control elements are provided with switches wired to the appropriate elements of the system.

Although the system has been described so that the entire display tube 42 is devoted to presenting the pictures related to an action-reaction television program, it is possible by conventional split-screen techniques, to permit the sharing of the television channels by the action-reaction television program and a conventional television program.

For example, the conventional television program can occupy the top three-fifths of the screen, while the action-reaction television program occupies the bottom two-fifths of the screen. By providing a mask, either one of the programs can be blocked from viewing. The sound for the action-reaction program can be obtained from a conventional radio receiver which is switched into the audio stages of the television receiver, and at the same time disabling the sound from the television transmitter.

In this case it will be further necessary to gang the turning knob of the radio receiver to the channel selector of the television receiver. Thus, any channel of the conventional television may be viewed while the action-reaction television is being presented.

There has thus been shown a television system which can be used to improve the presentation of audience participation programs such as educational television programs to students or viewers. The disclosed system permits the viewer to more fully participate in the program.

There has also been shown a system for enhancing simulation techniques for training a student in the manipulation of the controls of a vehicle such as an automobile.

It will now be obvious to those skilled in the art many modifications and variations which accomplish the objects of the invention and realizing many or all of the advantages but which do not depart essentially from the spirit of the invention, as defined in the claims which follow.

What is claimed is:

1. An information transfer system comprising a plurality of transmitters for transmitting information and control indicia, a receiver connected to selection means for receiving information indicia from one of said plurality of transmitters, said receiver generating information stimuli for a subject related to said information indicia, said selection means adapted to be operated by said subject for indicating the selection of another one of said transmitters by activating a switching means, switching means for switching the receiver to receive information indicia from another transmitter, and control means for receiving said control indicia to control said switching means to operate only when the control indicia transmitted is related to said another transmitter indicated by said selection means.

2. The system of claim 1 wherein said information transfer system is a television transmission system.

3. An information transfer system comprising a plurality of transmitters for transmitting information indicia and a plurality of control indicia, each of said plurality of control indicia being respectively assigned to one of said plurality of transmitters, a controlled receiver connected to a plurality of selection means for receiving indicia from one of said plurality of transmitters at a time, said receiver generating information stimuli related to receive information indicia, said plurality of selection means respectively assigned to said purality of transmitters, each of said plurality of selection means adapted to be operated for indicating the selection of another one of said transmitters by activating a switching means, a switching means controllably responsive to each of said selection means for switching the response of said receiver to the transmitter indicated by the operation of a selection means, and a plurality of control means respectively energized by one of said indicium controls, said switching means operating only when the control means energized by one of said control indicium is assigned to the same transmitter as the operated selection means.

4. The system of claim 3 wherein said information transfer system is a television system.

5. A television system comprising a plurality of television transmitters for transmitting information signals and control signals, a television receiver connected to selection means for receiving said information signals from one of said television transmitters to convert said information signals to stimuli, controlled switching means for switching said television receiver to receive information signals from another of said television transmitters, selection means adapted to be operated for selecting another television transmitter, and control means for receiving said control signals for controlling the activation of said switching means to occur only after both the operation of one of said selection means and the reception of a control signal by said control means.

6. A television system comprising a plurality of television transmitters for transmitting visual and aural information signals and for simultaneously transmitting control signals, a television receiver connected to selection means for receiving said visual and aural information signals from one of said television transmitters to convert said visual and aural information signals to visible and audible stimuli, controlled switching means in circuit with said television receiver for switching said television receiver to receive visual and aural information signals from another of said television transmitters, said selection means adapted to be operated for selecting a different television by activating said switching means transmitter and control means in circuit with said television receiver for receiving said control signals for controlling the activation of said switching means to occur only after both the operation of one of said selection means and the reception by the associated control means of a control signal.

7. A television system comprising a plurality of television transmitters for transmitting information signals and a plurality of control signals, each of said control signals being respectively related to one of said television transmitters, a television receiver connected to selection means for receiving said information signals from one of said television transmitters and converting said information signals to stimuli, controlled switching means in circuit with said television receiver for switching said television receiver to receive information signals from another of said television transmitters, said plurality of selection means under the control of the viewer for selecting a television transmitter by activating said switching means, each of said selection means adapted to be operated for selecting one of said plurality of television transmitters, and a plurality of control means each associated with one of said selection means for respectively receiving respectively one of said control signals for respectively activating said switching means to switch said television receiver to another of said television transmitters only after the operation of one of said selection means and the associated control means receives a control signal.

8. An action and reaction television system comprising a plurality of television transmitters for transmitting signals related to visual and aural information over a plurality of channels, means for incorporating in the signals related to visual information signals a plurality of signals related to light indicia, each of said light indicia being assigned to one of said plurality of television transmitters, a television receiver connected to selection means including a plurality of switches for receiving signals transmitted from one of said plurality of television transmitters, said television receiver having a channel selector, said television receiver including means for converting the signals related to said aural information to audible stimuli, means for converting the signals related to visual information to visible stimuli and the signals related to said plurality of light indicia to light indicia, said plurality of switches adapted to be operated to choose for reception by said television receiver the signals from one of said television transmitters by activating said channel selector, a plurality of light sensitive signal generating means in series electrical relationship with respectively each of said switches and disposed to detect one of said light indicia, and electromechanical means for repositioning said channel selector, said electromechanical means being electrically coupled to each of said switches to operate when one of said switches is closed and the associated serially disposed light sensitive signal generating means detects a light indicium.

9. An action and reaction television system comprising a plurality of television transmitters for transmitting signals related to visual and aural information over a plurality of channels; means for incorporating in the signals related to the visual information signals related to a plurality of light indicia respectively assigned to one of said plurality of television transmitters; a television receiver connected to selection means including a plurality of switches for receiving signals transmitted from one of said plurality of television transmitters, said television receiver having a channel selector, means for converting the signals related to said aural information to audible stimuli, and a display means having a display tube for converting the signals related to visual information to visible stimuli on said display tube and the signals related to said plurality of light indicia to areas of light on predetermined portions of said display tube; said plurality of switches adapted to be operated for choosing for reception by said television receiver the signals from one of said television transmitters by activating said channel selector, a plurality of light sensitive signal generating means in series circuit relationship with respectively each of said switches and disposed to monitor one of said prepetermined portions of said display tube; and electromechanical means for repositioning said channel selector electrically coupled to each of said switches and operating when one of said switches is closed and the associated serially disposed light sensitive signal generating means detects an area of light on its predetermined portion of said display tube.

10. An action and reaction television system comprising: a plurality of television transmitters for transmitting signals related to visual and aural information over a plurality of channels; means for incorporating in the signals related to visual information signals related to a plurality of light indicia respectively assigned to each of said plurality of television transmitters; a television receiver connected to selection means including a plurality of switches for receiving signals transmitted from one of said plurality of television transmitters, said television receiver having a channel selector, an audio system, and a video system with a display tube, said audio system converting the signals related to said aural information to audible stimuli, said video system converting the signals related to said visual information to visible stimuli on said display tube and the signals related to said plurality of light indicia to predetermined areas of light on said display tube; said plurality of switches adapted to be operated for choosing for reception by said television receiver the signals from one of said television transmitters by activating said channel selector; a plurality of photoelectric devices in series circuit relationship with respectively each of said switches and disposed to detect one of said areas of light; and solenoid operated switching means for operating said channel selector, said solenoid operated switching means coupled to each of said switches to operate when one of said switches is closed and the associated serially disposed photoelectric devices detects an area of light.

11. The apparatus of claim 10 including a training device for teaching the manipulation of a plurality of controls wherein each of said switches is respectively adapted to be operated by one of said controls.

12. The apparatus of claim 11 wherein said training device simulates an automobile.

13. A training device for teaching the operation of a plurality of controls by a subject comprising a plurality of sources of visual information, means for presenting the visual information from one of said sources to a trainee for creating stimuli, means associated with said plurality of sources of visual information for generating control functions at predetermined times, and controlled switching means adapted to be operated by said subject operable controls for causing the presentation of the visual information from another of said sources, said control function limiting the activation of said switching means by said controls to the time of occurrence of the control functions.

14. A training device for teaching the operation of a plurality of controls by a trainee comprising a plurality of sources of visual information, means for presenting the visual information from one of said sources at a time, means for generating a plurality of control functions, each of said control functions being respectively related to one of said controls, a plurality of switches, each of said switches adapted to be operated by one of said controls, controlled switching means operably connected to said switches and responsive to said switches for causing the presentation of the visual information from another of said sources, and means connected to said control function generating means and responsive to said control functions to cause the activation of said controlled switching means only after the occurrence of a control function and the operation of the switch related to the associated control.

15. An information transfer system comprising a plurality of sources which transmit information and control functions, said control functions transmitted by each of sources being related to at least one other of said sources, selection means which is connected to a receiving means and to a channel selector and is adapted to be operated for causing said receiving means to receive information from another of said sources, said receiving means connected to the selection means for receiving the selected information and control functions from one of said sources, means for receiving the control functions transmitted by the source whose information is being received by said receiving means for preventing the selection of another of said sources unless the control function related to said another of said sources is being transmitted.

16. The system of claim 15 wherein said information is video signals and said receiving means converts the video signals to visual stimuli.

17. An information transfer system comprising a plurality of sources of visual information, means cooperating with each of said sources for transmitting a plurality of control signals each of which is related to at least one other of said sources, selection means which is connected to a receiving means and to a channel selector and is adapted to be operated for selecting another of said sources, said receiving means connected to the selection means for presenting the selected visual information to a viewer from one of said sources, control means for receiving said control signals, and switching means for switching said receiving means to receive visual information from another source only when both the control signal related to said another source is received by said control means and the selection means has been operated to choose said another source.

References Cited in the file of this patent

UNITED STATES PATENTS

| 2,814,131 | Sheppard | Nov. 26, 1957 |
| 2,816,259 | Papitto | Dec. 10, 1957 |
| 2,870,548 | Chedister | Jan. 27, 1959 |

OTHER REFERENCES

"Remote Control for TV"; Radio and Television News, November 1955, pages 46, 47 and 48. (Copy available in U.S. Patent Office Scientific Library.)

UNITED STATES PATENT OFFICE
CERTIFICATE OF CORRECTION

Patent No. 3,008,005                                           November 7, 1961

Philip H. Barry et al.

It is hereby certified that error appears in the above numbered patent requiring correction and that the said Letters Patent should read as corrected below.

Column 2, line 70, for "return" read -- leave --; column 5, line 44, for "associaed" read -- associated --; column 16, line 12, for "enregizes" read -- energizes --; line 59, for "potentail" read -- potential --; column 17, lines 66 and 67, after "number" insert -- to the number --; column 20, line 24, after "the" insert -- variable --.

Signed and sealed this 26th day of June 1962.

(SEAL)
Attest:

ERNEST W. SWIDER
Attesting Officer

DAVID L. LADD
Commissioner of Patents